Patented Sept. 26, 1933

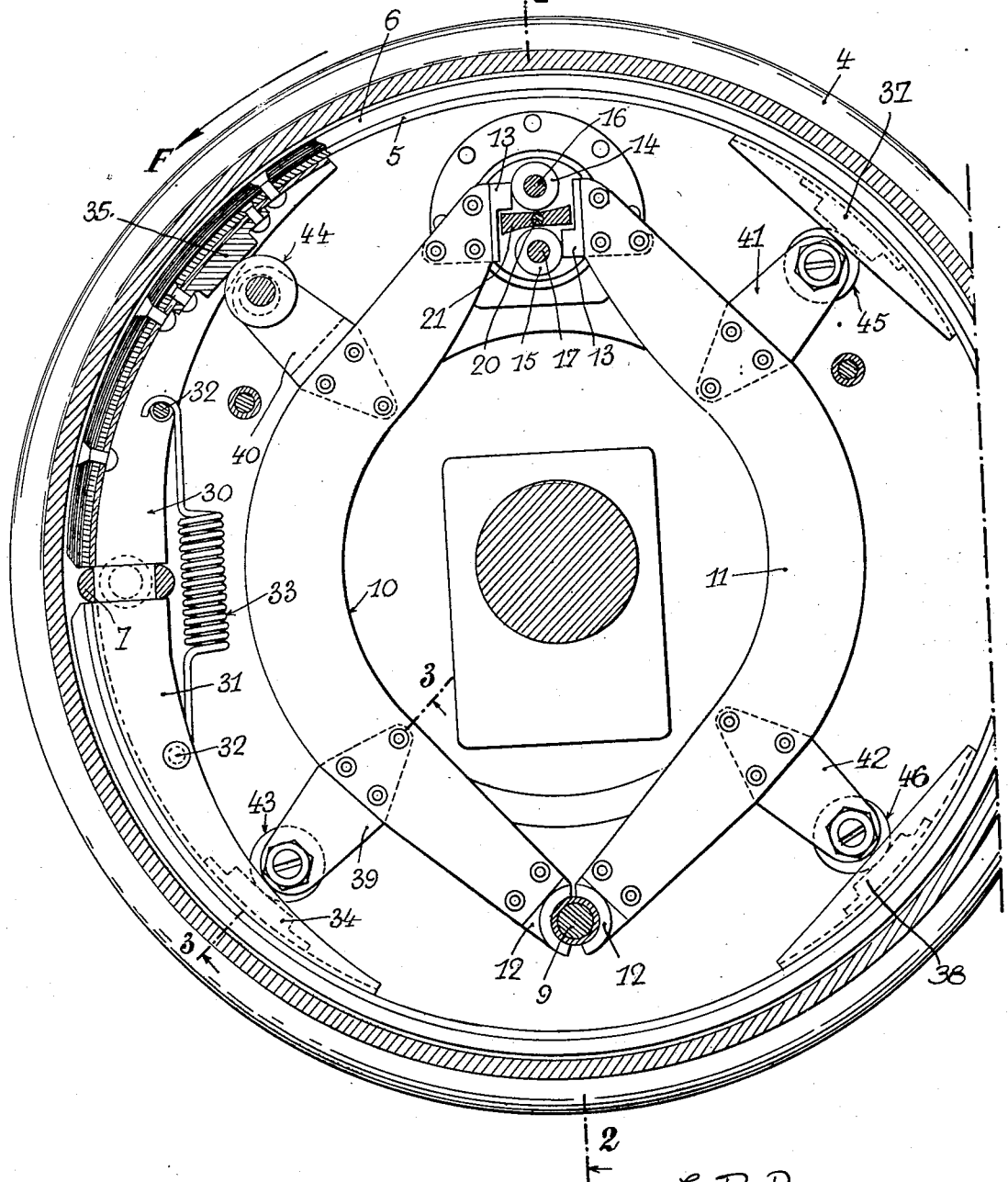

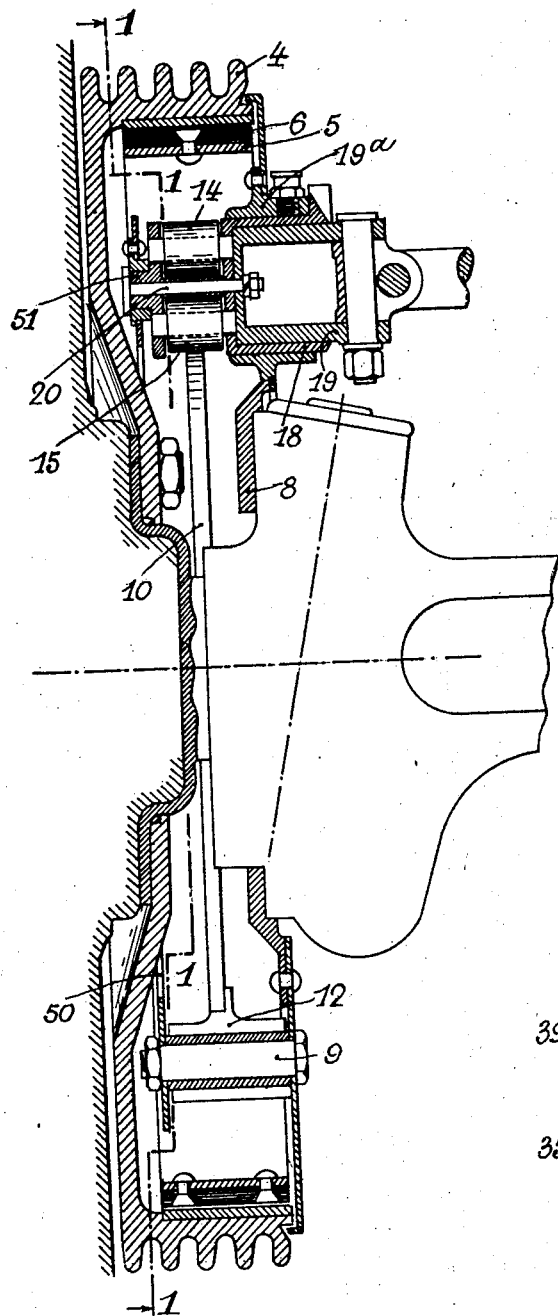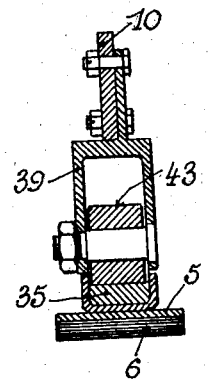

1,928,074

UNITED STATES PATENT OFFICE 1,928,074

CONCENTRICALLY EXPANDING BRAKE

Eugene Prosper Renaux, Paris, France, assignor to Bendix Brake Company, South Bend, Ind., a corporation of Illinois Application October 7, 1929, Serial No. 398,072, and in France November 3, 1928

10 Claims. (Cl. 188—78)

The present invention relates to improvements in brakes with concentric expansion of the type disclosed in my prior patent application No. 161,177 filed January 14th, 1927, that is to a brake comprising an elastic brake band, two shoe shaped members and a pressure transmitting device cooperating with said shoe shaped members and said brake band in such a manner as to move a number of equally spaced portions of the brake band through substantially equal radial distances, whereby the expansion of the brake band will be practically concentric with the brake drum, thus securing a uniform pressure of the brake band upon the entire periphery of the drum.

Now it has been found that a substantialy concentric expansion can be secured simply by the use of four rollers or equivalent members, mounted on said shoe shaped members and equally spaced upon the periphery of the brake drum, provided the pivot pin for the shoe shaped members is disposed at a suitable point near the periphery of the brake drum.

Due to this arrangement, the compensating levers disclosed in my prior specification above referred to may be dispensed with, thus simplifying the construction, while preserving almost completely the advantages of the concentric pressure.

The accompanying drawings show by way of example the construction of a brake according to the present invention.

Fig. 1 is a cross-section on the line 1—1 of Figure 2, of a brake according to the invention.

Fig. 2 is a section on the line 2—2 of Figure 1.

Fig. 3 is a section on the line 3—3 of Figure 1.

The brake shown in the drawings comprises a brake drum 4 the internal surface of which is adapted to be frictionally engaged by an elastic brake band 5, to which is riveted a friction facing member 6. An anchoring member or stop 7, secured to a cover plate 8 of the brake drum, is adapted to engage the upper end of said brake band in the forward motion of the wheel (as shown by the arrow f) and the lower end of said band in the back motion of the vehicle.

To a pin 9, mounted on said cover plate 8, are pivoted two levers or members 10—11, consisting of suitable stampings, to which are bolted stampings 12, forming two half-bearings embracing the pivot pin 9. Said levers on members are provided at the opposite end with wearing members 13, cooperating with two rollers 14—15, the spindles 16—17 of which are mounted on a thimble 18 rotatable in a bearing member 19ª, secured to cover plate 8. Within thimble 18 is rotatable a thimble 19 which is connected with the brake operating gear by any suitable means and to which is secured a spindle 20 carrying an operating cam 21. The rotation of spindle 20 and cam 21 causes the rotation of the rollers 14—15, together with the outer thimble 18, whereby the rollers are pressed upon the wearing members 13, thus spreading said levers or members 10—11 apart. As shown, the anchoring member 7 of the brake band is preferably situated in a plane perpendicular to a plane through the spindle 20 of the cam and the pivot pin 9. Said stop is engaged by the ends of two channel members 30—31, secured to the brake band and carrying studs 32 to which are attached the ends of the return spring 33 for said brake band.

Within said channel members are mounted wearing plates 34—35, the internal faces of which are concentric with the brake drum, and to the brake band are secured plates 37—38, similar to plates 34—35.

To each lever or member 10 and 11 is bolted a pair of forked brackets 39—40, 41—42 and in each bracket is mounted a pressure transmitting roller, 43—44—45—46, cooperating with a corresponding plate 34—35—37—38. The brackets are equally spaced with respect to each other so that the applied force through the rollers and wear plates to the brake band may be equally distributed.

It has been found that by disposing the pivot pin 9 of the levers at a suitable point near the periphery of the brake drum, the rollers 43—46, even though they are displaced, when said levers or members are spread apart, travel less distance than the upper rollers 44—45 since they are nearer the pivot pin 9, nevertheless assume a radial displacement which may be considered in practice and with a sufficient approximation, as equal to the radial displacement of the rollers 44—45; this is due to the fact that the circle the centre of which is the axis of pin 9 and the radius of which is the distance from said pin 9 to the centre of roller 43, intersects the circle corresponding to the internal wall of the brake drum almost at right angles, whilst the circle the centre of which is the axis of pin 9 and the radius of which is the distance from said pin to the centre of roller 46, intersects the circle of the brake drum at a very acute angle.

It is now apparent that the simple construction above described provides the concentric expansion of the brake band with sufficient approximation in practice; furthermore, the braking reaction upon the operating gear is entirely eliminated, as in the construction described in my prior specification, due to the cylindrical and concentrical outline of the wearing plates 34, 35, 37, 38.

To increase the resistance of the construction, it is advantageous to provide a metallic ring 50, through which extends a member 51, supporting the spindles of the rollers 14—15, the ring being further supported on the pin 9. All overhanging parts, and the subsequent prejudicial distortion are thus obviated.

Obviously, the above described arrangement is susceptible of numerous modifications in detail, without departing from the scope of the invention, as defined by the appended claims.

Having now described my invention what I claim as new and desire to secure by Letters Patent is:

1. A brake comprising a brake drum, internal expanding braking means, two levers, a pivot pin therefor and actuating means for forcing apart said levers, each of the latter comprising an arcuate stamping, two brackets secured to and protruding from the convex side of said levers, towards the ends thereof, rollers mounted in said brackets and adapted to directly engage said braking means, and wearing pieces on the levers for engaging said actuating means.

2. A brake as claimed in claim 1, wherein said actuating means comprises two rollers, a rotary support for rotatably carrying said rollers, and a cam member engaging said rollers and adapted to press the latter against said wearing pieces.

3. A brake comprising a brake drum, internal expanding braking means, two levers, a pivot pin therefor, a cam member for forcing apart said levers, each of the latter comprising an arcuate sheet metal stamping, two brackets secured to and protruding from the convex side of said stampings, towards the ends thereof, rollers mounted in said brackets and adapted to directly engage said braking means, bearing members on the pivotal ends of the levers for engaging said pivot pin, a wearing piece at the opposite end for engaging said cam member and a supporting ring adapted to hold the overhanging ends of said pivot pin and of the spindle of said cam member.

4. A brake comprising a brake drum, an internal expanding elastic brake band, two levers, a pivot pin therefor and actuating means for forcing apart said levers, each of the levers comprising an arcuate sheet metal stamping, two brackets secured to and protruding from the convex side of each lever, towards the ends thereof, rollers mounted in said brackets and adapted to directly engage said elastic brake band, a bearing at one end of each lever, for engaging said pivot pin and a wearing piece at the opposite end of each lever for engaging said actuating means.

5. A brake comprising a drum, a semi-flexible friction band associated therewith and means including radially disposed brackets and rollers supported thereby for expanding the band concentrically to engage the drum.

6. A brake comprising a drum, a friction band associated therewith, means for expanding the friction band for engagement with the drum including a pair of pivoted levers, brackets arranged on the levers in spaced relation, rollers carried by the brackets adaptable for engagement with the band and means for actuating the levers.

7. A brake operating member comprising a rotatable member, spaced rollers positioned thereon and an operating cam movable between the rollers.

8. A brake operating member comprising a bracket, a member rotatable in the bracket, spaced rollers positioned on the member and a cam movable between the rollers.

9. A brake operating member comprising a bracket, a thimble positioned for rotation in the bracket, spaced shafts supported by the thimble, rollers on the shafts and a cam positioned for rotation between the rollers.

10. A brake operating member comprising a support, a thimble rotatable in the support, circular shafts arranged in spaced relation on the thimble, rollers on the shafts, a member positioned for rotation in the thimble and a cam carried by the member adapted to engage the rollers.

EUGÈNE PROSPER RENAUX.